United States Patent
Benitez et al.

(10) Patent No.: US 10,782,453 B2
(45) Date of Patent: Sep. 22, 2020

(54) DISPLAY DEVICES WITH REFLECTORS

(71) Applicant: TESSELAND LLC, Glendale, CA (US)

(72) Inventors: Pablo Benitez, Madrid (ES); Juan Carlos Minano, Madrid (ES); Dejan Grabovickic, Madrid (ES); Milena Nikolic, Madrid (ES)

(73) Assignee: TESSELAND, LLC, Pasadena, CA (US)

( * ) Notice: Subject to any disclaimer, the term of this patent is extended or adjusted under 35 U.S.C. 154(b) by 0 days.

(21) Appl. No.: 15/545,636

(22) PCT Filed: Jan. 20, 2016

(86) PCT No.: PCT/US2016/014162
§ 371 (c)(1),
(2) Date: Jul. 21, 2017

(87) PCT Pub. No.: WO2016/160099
PCT Pub. Date: Oct. 6, 2016

(65) Prior Publication Data
US 2018/0003978 A1    Jan. 4, 2018

Related U.S. Application Data

(60) Provisional application No. 62/208,235, filed on Aug. 21, 2015, provisional application No. 62/105,905, filed on Jan. 21, 2015.

(51) Int. Cl.
G02B 27/14    (2006.01)
G02B 3/00    (2006.01)
(Continued)

(52) U.S. Cl.
CPC ........... *G02B 3/0037* (2013.01); *G02B 27/01* (2013.01); *G02B 27/0172* (2013.01);
(Continued)

(58) Field of Classification Search
CPC ........ G02B 27/0172; G02B 2027/0123; G02B 2027/0134; G02B 2027/11;
(Continued)

(56) References Cited

U.S. PATENT DOCUMENTS 5,699,194 A    12/1997    Takahashi
5,701,202 A    12/1997    Takahashi
(Continued)

FOREIGN PATENT DOCUMENTS

JP    5-84930 U    11/1993
JP    H0638219 A    2/1994
(Continued)

OTHER PUBLICATIONS

International Search Report of PCT/US2016/014162, dated Oct. 20, 2016 (Oct. 20, 2016).
(Continued)

*Primary Examiner* — Alicia M Harrington
(74) *Attorney, Agent, or Firm* — Faegre Drinker Biddle & Reath LLP

(57) ABSTRACT

A display device has a display, operable to generate a real image, and an optical system. In the optical system are at least two free-form reflective surfaces, S I and S2. At least one of the reflective surfaces is convex in one direction at substantially all points of its optically active area. Light rays from the display are reflected on SI before they are reflected on S2. The reflective surfaces SI and S2 are arranged to generate a virtual image from the real image on the display, by projecting light from the display to an eye position. The field of view occupied by the virtual image as seen from the eye position is greater than 50 degrees in at least one direction, preferably the direction linking the two eyes of an intended user.

14 Claims, 8 Drawing Sheets

(51) Int. Cl.
  *G02B 30/24* (2020.01)
  *H04N 13/344* (2018.01)
  *H04N 13/341* (2018.01)
  *G02B 27/01* (2006.01)
  *G06T 15/00* (2011.01)
  *H04N 13/383* (2018.01)
  *G02B 27/00* (2006.01)
  *G06T 19/00* (2011.01)

(52) U.S. Cl.
  CPC .............. *G02B 30/24* (2020.01); *G06T 15/00* (2013.01); *H04N 13/341* (2018.05); *H04N 13/344* (2018.05); *G02B 27/0093* (2013.01); *G02B 2027/0123* (2013.01); *G02B 2027/0134* (2013.01); *G06T 19/006* (2013.01); *H04N 13/383* (2018.05)

(58) Field of Classification Search
  CPC .... G02B 2027/0178; G02B 2027/1032; G02B 27/017; G02B 3/0037; H04N 13/344; H04N 13/0484; H04N 13/044
  See application file for complete search history.

(56) References Cited

U.S. PATENT DOCUMENTS

| | | | |
|---|---|---|---|
| 5,706,136 A | 1/1998 | Okuyama et al. | |
| 5,726,670 A | 3/1998 | Tabata et al. | |
| 5,838,490 A | 11/1998 | Fritz | |
| 6,185,045 B1 | 2/2001 | Hanano | |
| 7,689,116 B2 | 3/2010 | You et al. | |
| 8,605,008 B1 | 12/2013 | Prest et al. | |
| 2004/0227703 A1 | 11/2004 | Lamvik et al. | |
| 2008/0291531 A1* | 11/2008 | Heimer | G02B 7/002 359/351 |
| 2008/0316606 A1 | 12/2008 | Inoguchi et al. | |
| 2009/0115842 A1 | 5/2009 | Saito et al. | |
| 2009/0295683 A1 | 12/2009 | Pugh et al. | |
| 2010/0149073 A1 | 6/2010 | Chaum et al. | |
| 2011/0194163 A1 | 8/2011 | Shimizu et al. | |
| 2012/0081800 A1 | 4/2012 | Cheng et al. | |
| 2012/0120499 A1 | 5/2012 | Harrison et al. | |
| 2012/0123742 A1 | 5/2012 | Harrison et al. | |
| 2012/0154920 A1* | 6/2012 | Harrison | G02B 3/0056 359/619 |
| 2012/0162549 A1* | 6/2012 | Gao | G02B 27/0172 349/11 |
| 2014/0009845 A1 | 1/2014 | Cheng et al. | |
| 2014/0062865 A1* | 3/2014 | Fateh | G06T 11/206 345/156 |
| 2016/0116745 A1* | 4/2016 | Osterhout | G06F 3/03547 359/614 |
| 2016/0195720 A1* | 7/2016 | Travis | G03H 1/2205 345/8 |
| 2016/0313556 A1 | 10/2016 | Futterer | |

FOREIGN PATENT DOCUMENTS

| | | |
|---|---|---|
| JP | H0965245 A | 3/1997 |
| JP | H010246866 A | 9/1998 |
| JP | 2002040364 A | 2/2002 |
| JP | 2004258332 A | 9/2004 |
| JP | 2009003128 A | 1/2009 |
| JP | 2009115906 A | 5/2009 |
| JP | 2014503836 A | 2/2014 |
| WO | 2015077718 A1 | 5/2012 |
| WO | 2015088468 A1 | 6/2015 |

OTHER PUBLICATIONS

Written Opinion of the International Searching Authority of PCT/US2016/014162, dated Oct. 20, 2016 (Oct. 20, 2016).
Hoshi et al.; Off-Axial HMD optical system consisting of aspherical surfaces without rotational symmetry; dated Apr. 10, 1996; 1 page.
Eye-Trek FMD-700; Olympus Corporation; dated May 24, 2000; 3 pages.

* cited by examiner

DISPLAY DEVICES WITH REFLECTORS

CROSS REFERENCE TO RELATED APPLICATIONS

This application claims benefit of commonly assigned U.S. Provisional Patent Applications No. 62/105,905, filed on 21 Jan. 2015, and No. 62/208,235 filed on 21 Aug. 2015, both with common inventors, both for "Immersive Compact Display Glasses." Both of those applications are incorporated herein by reference in their entirety. This application is related to commonly assigned International Patent Application No. WO 2015/077718 with common inventors, published 28 May 2015, for "Immersive compact display glasses," which is incorporated herein by reference in its entirety.

FIELD OF THE INVENTION

The application relates to visual displays, and especially to head-mounted display technology.

BACKGROUND

1. Definitions

| | |
|---|---|
| Concave reflective surface at a point | Consider a reflective surface whose normal vectors are oriented pointing towards the volume where the rays impinge on it, and a point P with normal vector N on the surface. We say a surface is concave at the point P if the centers of curvature $C_1$ and $C_2$ of the two principal curvature lines passing through that point fulfil that $(C_1 - P) \cdot N$ and $(C_2 - P) \cdot N$ are both positive (the dot indicates vector scalar product). |
| Convex reflective surface in at least one direction of principal curvature at a point. | Consider a reflective surface whose normal vectors are oriented pointing towards the volume where the rays impinge on it, and a point P with normal vector N on the surface. We say a surface is convex in at least one direction of principal curvature at the point P if the center of curvature $C_1$ of at least one of the two principal curvature lines passing through that point fulfils that $(C_1 - P) \cdot N$ is negative (the dot indicates vector scalar product). |
| display | Component, usually electronic, that modulates light spatially, which can be self-emitting, such as an OLED display, or externally illuminated by a front or a backlight system, such as an LCD or an LCOS. |
| eye pupil | Image of the interior iris edge through the eye cornea seen from the exterior of the eye. In visual optics, it is referenced as the input pupil of the optical system of the eye. Its boundary is typically a circle from 3 to 7 mm diameter depending on the illumination level. |
| eye sphere | Sphere centered at the approximate center of the eye rotations and with radius the average distance of the eye pupil to that center (typically 13 mm). For practical reasons the eye(s) of the user may be represented by an imaginary representation of a typical eye or pair of eyes. |
| field of view | The horizontal and vertical full angles subtended by the virtual screen from the eye pupil center when the two eyes rest looking frontwards, or the region within those angles. |
| fixation point | Point of the scene that is imaged by the eye at center of the fovea, which is the highest resolution area of the retina and typically has a diameter of 1.5 mm. |
| gaze vector | Unit vector of the direction linking the center of the eye pupil and the fixation point. |
| gazed region of ImageSurface | Region of the virtual screen containing the fixation points for all positions of the eye pupil within the union of the pupil ranges. It contains all the ipixels that can be gazed. |
| ipixel | Virtual image of the opixels belonging to the same web. Preferably, this virtual image is formed at a certain distance from the eye (from 2 m to infinity). It can also be considered as the pixel of the virtual screen seen by the eye. |
| opixel | Physical pixel of the digital display. There are active opixels, which are lit to contribute to the displayed image, and inactive opixels, which are never lit. An inactive opixel can be physically nonexistent, for instance, because the display lacks at that opixel position at least one necessary hardware element (OLED material, electrical connection) to make it functional, or it can be unaddressed by software. The use of inactive opixels reduces the power consumption and the amount of information to be managed. |
| peripheral angle | Angle formed by a certain direction and the gaze vector. |
| virtual screen | Surface containing the ipixels, preferably being a region of the surface of a sphere concentric with the eye and with radius in the range from 2 m to infinity. |

2. State of the Art

Head mounted display technology is a rapidly developing area. One aspect of head mounted display technology is that it can provide a full immersive visual environment (which can be described as virtual reality), such that the user observes only the images provided by one or more displays, while the outside environment is visually blocked. These devices have application in areas such as entertainment, gaming, military, medicine and industry. In US 2010/0277575 A1 by Ismael et al. there is a description of one of such device. The basic optical function of a Head Mounted Display (HMD) is that of a stereo-viewer such as the one described in U.S. Pat. No. 5,390,047 by Mizukawa.

A head mounted display consists typically of one or two displays, with their corresponding optical systems, which image the displays into a virtual screen to be visualized by the user's eye. The display may also have a pupil tracker and/or a head tracker, such that the image provided by the display changes according to the user's movement.

The displays may be of the type called Light Field Displays (F. Huang, K. Chen, G. Wetzstein. "The Light Field Stereoscope: Immersive Computer Graphics via Factored Near-Eye Light Field Displays with Focus Cues", ACM SIGGRAPH (Transactions on Graphics 33, 5), 2015) implemented by stacked (transmisive) LCDs. Particularly interesting because of its thickness is the case of just 2 stacked LCDs with a separator between them. Light Field Displays support focus cues which together with the rest of the device help to solve the vergence-accommodation conflict at a reasonable cost and volume. This conflict may lead to visual discomfort and fatigue, eyestrain, diplopic vision, headaches, nausea, compromised image quality, and it may even lead to pathologies in the developing visual system of children.

An ideal head mounted display combines a high resolution, a large field of view, a low and well-distributed weight, and a structure with small dimensions. Although some technologies successfully achieve these desired features individually, so far no known technology has been able to combine all of them. That results in an incomplete or even uncomfortable experience for the user. Problems may include a low degree of realism and eye strain (low resolution or optics imaging quality), failure to create an immersive environment (small field of view), or excessive pressure on the user's head (excessive weight).

There are two types of HMDs, one in which the user observes only the information from displays (virtual reality, VR) and another in which the virtual objects are mixed with the real environment (augmented reality, AR). Additionally, the information presented to each eye may be the same (2D) or different to include the stereoscopic vision (3D).

The typical VR system shows a stereoscopic immersive virtual reality with large field of view and occupies a large volume.

Compared to VR systems, the typical AR systems have better ergonomics, show higher resolution (measured in pixels per degree) and have a much smaller field of view, so only small portion of the user's natural field of vision is superimposed with the virtual information.

A prior art device with application to AR is described in WO 2015/088468A1 by Moskalenko et al. That device consists of a single concave rotational mirror whose axis of revolution passes through the center of revolution of the eye, and a curved display whose surface approximates points that are optically conjugated with specified points of the image observed by the eye though the reflection. This device is integrated in spectacles produced by Kverve Optics AS, who report that they provide a vertical field of view (FoV) of 43 degrees and 200 degrees horizontal FoV with full binocular superposition inside 50 degrees.

Another device for AR, described in U.S. Pat. No. 5,838,490 by Fritz et al. comprises a partially reflective 45° tilted flat filter, a Mangin mirror having a curved reflecting surface to receive the light reflected from the filter and reflect it back through the filter to the eye, and a transparent element mated to the curved surface of the Mangin mirror allowing the light from a remote scene passing undistorted through the optical system to the eye.

Another HMD design, shown in FIG. 1, is based on a free-form wedge-shaped prism, and was first presented by Morishima (H. Morishima, T. Akiyama, N. Nanba, and T. Tanaka, "The design of off-axial optical system consisting of aspherical mirrors without rotational symmetry," in 20th Optical Symposium, Extended Abstracts, 1995, Vol. 21, pp. 53-56), while the fabrication and evaluation method were explored by Inoguchi et al. ("Fabrication and evaluation of HMD optical system consisting of aspherical mirrors without rotation symmetry," Japan Optics '95, Extended Abstracts, 20pB06, pp. 19-20, 1995). Free-form here means that the optically active surfaces have neither rotational nor linear symmetry. Following these pioneering efforts, many attempts have been made to design HMD optics using free-form wedge-shaped prisms. For instance, U.S. Pat. Nos. 5,699,194, 5,701,202, both by Takahashi, U.S. Pat. No. 5,706,136 by Okuyama & Takahashi, D. Cheng, et al., "Design of a lightweight and wide field-of-view HMD system with free form surface prism," Infrared and Laser Engineering, Vol. 36, 3, 2007). Also, Hoshi et al. presented a free form surface (FFS) prism offering a FoV of 34° and a thickness of 15 mm (H. Hoshi, N. Taniguchi, H. Morishima, T. Akiyama, S. Yamazaki, and A. Okuyama, "Off-axial HMD optical system consisting of aspherical surfaces without rotational symmetry," Proc. SPIE 2653, 234-242, 1996); Yamazaki et al. described a 51° Optical-See-Through HMD design consisting of a free-form prism and an auxiliary lens attached to the prism (S. Yamazaki, K. Inoguchi, Y. Saito, H. Morishima and N. Taniguchi, "Thin wide-field-of-view HMD with free-form-surface prism and applications", Proc. SPIE 3639, 453, 1999). More recently, U.S. Pat. No. 8,605,008 to Prest et al. includes a similar wedge-shaped prism optics in his description. There are also several commercially available HMD products based on the FFS prism concept. For instance, Olympus released their Eye-Trek series of HMDs based on free-form prisms. Emagin carried Z800 with the optical module WFOS, Daeyang carried i-Visor FX series (GEOMC module, A3 prism) products; Rockwell Collins announced the ProView SL40 using the prism technology of OEM display optics. US Patent Application No. 2012/0081800 "Optical see-through free-form head-mounted display" by D. Cheng et al., also proposes an optical design for HMD applications, where in particular a see-through free-form head-mounted display including a wedge-shaped prism-lens having free-form surfaces and low F-number is presented.

There are several differences of these wedge shaped prisms from the devices disclosed herein (such as the one shown in FIG. 8). First, the type (i.e. refraction, reflection, total internal reflection) and number of deflections that rays suffer on their way from the digital display to the eye are different. Second, the first reflective surface in those prior art wedge-shaped prisms has a concave surface, while in the present embodiments the first reflective surface is convex in at least one direction of principal curvature at substantially all points of its optically active area. This gives the present devices the capacity of providing larger focal lengths in the same occupied space. These larger focal lengths permit the use of low cost displays based on non-crystalline backplane technologies (with diagonals typically over 1.5 inches, 38.1 mm), while those prior art wedge shaped prisms, with their shorter focal lengths, are only suitable for small displays, which are made of more expensive crystalline backplanes (with diagonals typically below 1 inch, 25.4 mm). Third, an additional refractive lens is introduced in the present embodiments to enlarge the field of view for VR applications.

U.S. Pat. No. 7,689,116 by Ho Sik You et al., applicable to a mobile camera, presents an optical lens system which assures a wide field of view (FoV) by dividing an original FoV into a plurality of FoVs and by providing separate off-axis lens systems corresponding to each one of the new FoVs, thereby achieving a thinner mobile camera optical lens system. FIG. 2 explains the basis of You's system, particularized for the case where we only have two different view angles, i.e. two different ranges of field of view. In FIG. 2, the light emitted by the object (in the example, the flower 201) is transmitted through the optical system and impinges on the image plane 202, where a light sensor is placed. The light corresponding to the top half of the FoV enters the system through refractive surface 203, while the bottom half of the FoV enters the system through refractive surface 204. Both halves of the optical system are symmetrical, as shown in FIG. 2. The rays belonging to the top half are deflected successively by four different surfaces: first refracted on entrance surface 203, then reflected on back surface 207, again reflected on front surface 208, then refracted by exit surface 209, and finally impinge on the top half of the image plane 202. Due to the particular optical architecture used in this device, each half of the image obtained on the image plane is inverted 205. This situation is corrected electronically, in order to finally obtain the desired image 206.

There are several differences between our embodiment shown in FIG. 7 and You's system. First, the present embodiment is for a different application, i.e. head-mounted displays, while You's device is a mobile camera optical lens. That requires major differences in the optical geometry. Then, the physical object in You's optical system (which is the scene to take the picture of) is located at a far distance from the lens, while our equivalent element (the digital display) is at a very short distance from the lens, even touching it. On the other hand, You's image is real (projected onto the camera sensor 202) and is located very close to the lens, while our equivalent element (the virtual screen) is virtual and is located far from the lens. The output pupil in our case is real, located on the right side of the lens and is defined as the pupil range to allow for eye movements, while in You's case the equivalent pupil (which is the exit one) is virtual and is located at the opposite side of the lens.

SUMMARY

One aspect of the present disclosure provides a display device comprising a display, operable to generate a real image comprising a plurality of object pixels, and an optical system, comprising at least two surfaces at which the rays are reflected (by a mirror or being reflected by TIR), designed to generate a virtual image from the real image.

Another aspect provides a display device comprising a display, operable to generate a real image, and an optical system, comprising at least two free-form reflective surfaces, S1 and S2, such that at least one of surfaces S1 and S2 is convex in at least one direction at substantially all points of its optically active surface. Those reflective surfaces are arranged to generate a virtual image from the real image on the display, by projecting light from the display to an eye position. The field of view occupied by the virtual image as seen from the eye position is greater than 50 degrees in at least one direction. The optical system is arranged to produce a virtual image that contains a foveal part projected by a normal human eye onto a 1.5 mm fovea of said eye when said eye is at the eye position with a pupil of the eye within a pupil range, the foveal part of said virtual image having a higher resolution than a peripheral part.

The one of surfaces S1 and S2 that is convex in at least one direction at substantially all optically active points may be surface S1, with surface S2 concave at substantially all optically active points, and where the light rays from the display are reflected on S1 before they are reflected on S2.

The display device may further comprise a lens in the optical path between the display and the eye position. The field of view in the at least one direction may be more than 80 degrees.

The lens may be between the display and mirror S1.

The lens may be between mirror S1 and mirror S2.

The reflective surface S2 may be semitransparent and be on a transparent substrate, permitting a direct view of an external environment from the eye position.

The reflective surface S2 may then be on a surface of the transparent substrate nearer to the eye position or may be adjacent to an additional transparent substrate further from the eye than the reflective surface S2. A frontward entrance surface of the transparent substrate or the additional transparent substrate, through which light from the external environment enters the optical system, may be so formed that light rays from the external environment exiting the optical system to the eye position exit the optical system substantially parallel to directions in which the respective rays entered the optical system.

The display may be offset laterally from a direct line of view of the eye.

The optical system may be placed at a distance between 5 and 40 mm from an imaginary 13 mm radius sphere at the eye position, the optical system may subtend a solid angle from a closest point of the imaginary sphere comprising a cone with 40 degrees whole angle, and the display may be on a side of the optical system remote from the imaginary sphere, at a distance from the optical system of no more than 40 mm.

The focal lengths may be from 15 to 60 mm. The monocular horizontal field of view may be larger than 50 degrees.

The embodiments designed for Augmented Reality applications (AR) may have at least one semi-transparent mirrored surface allowing the user to see through that surface, as well as reflecting the projected virtual images. In the case of AR, at least one additional free form refractive surface is usually designed to correct distortion of the images coming from real environment.

An embodiment for Virtual Reality applications (VR) may comprise an additional refractive surface, and may provide monocular horizontal and vertical fields of view of 100 degrees and 70 degrees, respectively.

Another aspect provides a headgear comprising the display device according to any of the above aspects and/or embodiments, with a mount for positioning the display device on a human head with the eye position of the display device coinciding with an eye of the human.

The at least one direction in which the field of view occupied by the virtual image as seen from the eye position is greater than 50 degrees may be parallel to a direction joining the eyes of a person wearing the headgear.

The headgear may further comprise a second display device according to any of the above aspects and/or embodiments, mounted with the eye position of the second display device coinciding with a second eye of the human.

BRIEF DESCRIPTION OF DRAWINGS

The above and other aspects, features and advantages will be apparent from the following more particular description of certain embodiments, presented in conjunction with the following drawings. In the drawings.

DETAILED DESCRIPTION

The embodiments to be described here are designed for HMD devices, suitable for augmented reality (AR) or virtual reality (VR) applications. These embodiments aim to provide simultaneously a wide field of view, high resolution, low weight, and small volume.

For an effective immersive experience, this wide field of view must to be provided independently of the eye pupil orientation relative to the head. This approach considers the pupil range as a design parameter. The maximum pupil range is the region of the eye sphere formed by the union of all physically accessible pupil positions for an average human. It is then a spherical shell in good approximation. The boundary of the maximum pupil range is approximately an ellipse with angular horizontal semi-axis of 60 degs and vertical semi-axis of 45 degs relative to the front direction, subtended at the center of rotation of the eye. However, for a practical immersive design, an elliptical cone of semi-axis in the 15 to 30 degrees range can be considered sufficient for the pupil range definition.

Human vision resolution peaks on the part of the scene imaged at the fovea (which is about 1.5 mm in diameter) and decreases rapidly away from that part. Therefore, the angular resolution of a typical human eye is a decreasing function of the peripheral angle (according to J. J. Kerr, "Visual resolution in the periphery", Perception & Psychophysics, Vol. 9 (3), 1971). Since the human eye resolution is much coarser in peripheral vision than close to the gazing direction, the embodiments in this specification have been designed to match the imaging quality so that the ipixels of the virtual screen are no finer than strictly needed (because the eye will not appreciate further increase in fineness).

Embodiments shown here consist of:

A display whose surface coincides preferably with a plane or a cylinder, and which is composed by a multiplicity of physical pixels called object pixels or "opixels".

An optical system, which can contain various numbers of refractive/reflective surfaces, providing a virtual image composed by pixels on a virtual screen, called "ipixels". The virtual screen is preferably spherical, lying at a certain distance from the eye; and the virtual image is defined by a mapping from opixels to ipixels.

Figure 3:
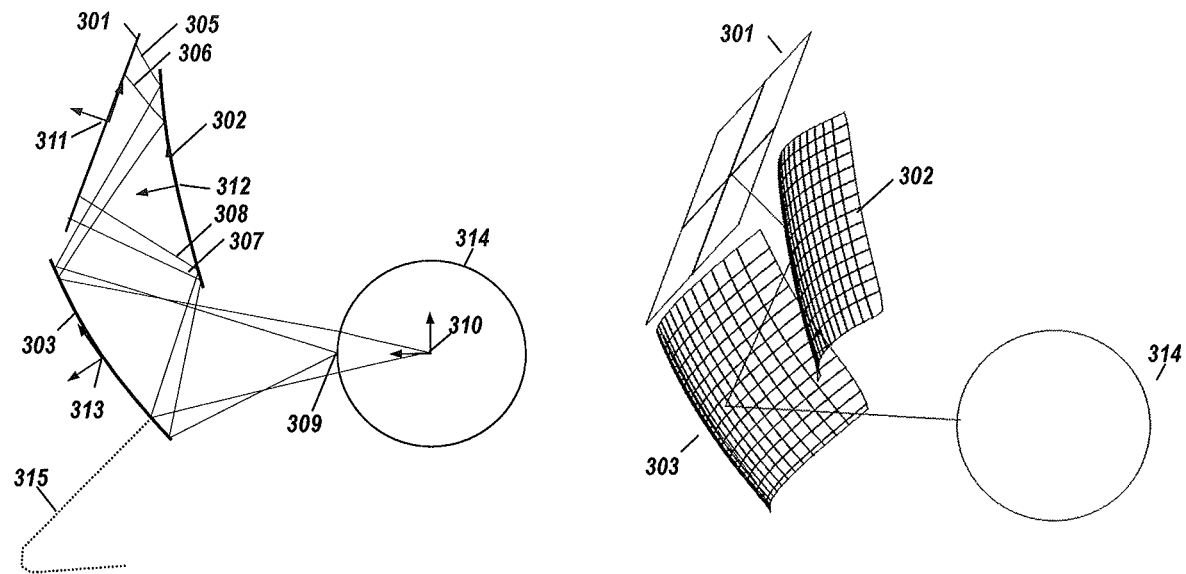
FIG. 3 shows a two-mirror free-form HMD for Virtual Reality.

FIG. 3 shows a two-mirror embodiment together with user's eye 314 and nose 315 shown for orientation purpose. This design is denoted an XX (which means that the lens consists of two surfaces, both being reflective) design. Rays 305, 306, 307 and 308 emitted by the digital display 301 undergo 2 reflections: first on freeform mirror surface 302 and then on the see-through free-form mirror 303 to be directed to the eye 314. After 2 reflections, rays 306 and 308 are directed towards the eye sphere center 310. The rays 305 and 307 define the vertical FoV of this mirror device as these are edge rays of the eye input pupil center 309 when eye rests looking forward and these rays come from the edges of the display 301. The embodiment generates a virtual image from the real image that appears on the display. The distortions of the virtual image, if any, are corrected electronically by imparting a contrary distortion to the real image on display 301.

FIG. 3 shows an example of an XX design with focal length f=52 mm, and 35° of vertical FoV and 60° of horizontal FoV. FIG. 3 left shows a vertical cross-section at the x=0 plane. Surfaces are described with the equation $z=P_m(x,y)$:

$$Pm(x, y) = \sum_{i=0}^{\frac{m}{2}} \sum_{j=0}^{m} c_{2i,j} P_{2i}\left(\frac{x - \frac{x_{max} + x_{min}}{2}}{x_{max}}\right) P_j\left(\frac{y - \frac{y_{max} + y_{min}}{2}}{y_{max}}\right),$$

where $Pm(x,y)$ is the $10^{th}$ order polynomial, i.e. m=10, $c_{2i,j}$ are surface coefficients listed in Table 1 below, and $P_{2i}((x-(x_{max}+x_{min})/2)/x_{max})$ and $P_j((y-(y_{max}+y_{min})/2)/y_{max})$ are Legendre-polynomials that are orthogonal inside the rectangle $x_{min}<x<x_{max}$, and $y_{min}<y<y_{max}$. All surfaces are symmetric respect to the plane x=0 (the plane of the drawing shown in FIG. 3) so Legendre polynomial $P_{2i}((x-(x_{max}+x_{min})/2)/x_{max})$ has only pair order monomials. The Legendre polynomial $P_n(x)$ can be expressed as:

$$P_n(x) = \frac{1}{2^n} \sum_{k=0}^{n} \binom{n}{k}^2 (x-1)^{n-k}(x+1)^k = 2^n \sum_{k=0}^{n} x^k \binom{n}{k}\binom{\frac{n+k-1}{2}}{n}$$

Where the latter expresses the Legendre polynomials by simple monomials and involves the multiplicative formula of the binomial coefficient, and where $$\binom{n}{k} = \frac{n!}{k!(n-k)!}.$$

The origin of the global coordinate system (x,y,z)=(0, 0, 0) is placed in the eye center 310. The local coordinate system for a display 311, with 2.5" (63.5 mm) diagonal and aspect ratio 16:9, has coordinates (x,y,z)=(0, 32.6943, 44.2473) and it is rotated 20° around the x axis in negative (clockwise) direction with respect to the global coordinate system. The local coordinate system 312 for mirror 302 has its origin at (x,y,z)=(0, 23.7419, 34.8724) and is rotated 11.6039° around the x axis in positive (counterclockwise) direction respect to the global coordinate system. The local coordinate system 313 for mirror 303 has its origin at (x,y,z)=(0, 0, 45), and is rotated 33.4493° around the x axis in positive direction respect to the global coordinate system. Coordinates are given in mm. Coefficients of all surfaces' polynomials are listed in Table 1. The first four rows are $x_{min}$, $x_{max}$, $y_{min}$ and $y_{max}$ that describe rectangular area between $x_{min}$ and $x_{max}$ in x-direction, and $y_{min}$ and $y_{max}$ in y-direction where every Legendre polynomial $P_m(x,y)$ is orthogonal. The subsequent rows of Table 1 are the coefficients of $10^{th}$ order Legendre polynomial $P_m(x,y)$ for each surface we have designed. "Mirror-1" in Table 1 corresponds to the mirror 302 in FIG. 3. "Mirror-2" in Table 1 corresponds to the mirror 303 in FIG. 3.

TABLE 1

| Parameter | Mirror-1 | Mirror-2 |
|---|---|---|
| $x_{min}$ | −18 | −27 |
| $x_{max}$ | 18 | 27 |
| $y_{min}$ | −16 | −16 |
| $y_{max}$ | 16 | 16 |
| $c_{0,0}$ | −1.42507 | −2.59056 |
| $c_{0,1}$ | 0.0451835 | 0.143174 |
| $c_{0,2}$ | −0.72009794 | −1.06388171 |
| $c_{0,3}$ | −0.01547969 | 0.01484046 |
| $c_{0,4}$ | 0.00206765 | −0.00346054 |
| $c_{0,5}$ | −0.00028542 | −0.0012447 |
| $c_{0,6}$ | 0.00064372 | −0.00035631 |
| $c_{0,7}$ | 0.00029827 | −0.00175909 |
| $c_{0,8}$ | 0.00076968 | −0.0005269 |
| $c_{0,9}$ | −0.00289666 | −0.00057807 |
| $c_{0,10}$ | −0.0009011 | −0.00041103 |
| $c_{2,0}$ | −2.17547149 | −4.19354056 |
| $c_{2,1}$ | 0.04495347 | 0.20853189 |
| $c_{2,2}$ | −0.0315604 | −0.07086542 |
| $c_{2,3}$ | −0.02546096 | −0.00760281 |
| $c_{2,4}$ | −8.14E−05 | −0.00087688 |
| $c_{2,5}$ | 0.00194202 | 0.00111976 |
| $c_{2,6}$ | 0.00036391 | −0.00406823 |
| $c_{2,7}$ | −0.00263027 | −0.00127324 |
| $c_{2,8}$ | −0.00388143 | −0.00244588 |
| $c_{2,9}$ | 0 | 0 |
| $c_{2,10}$ | 0 | 0 |
| $c_{4,0}$ | −0.01848644 | −0.0570722 |
| $c_{4,1}$ | −0.02417861 | −0.04399492 |
| $c_{4,2}$ | 0.01349926 | −0.01382028 |
| $c_{4,3}$ | 0.00473022 | −0.0034179 |
| $c_{4,4}$ | −0.00384481 | −0.00095022 |
| $c_{4,5}$ | −0.00295132 | 0.00035308 |
| $c_{4,6}$ | 0.00010286 | −0.00039971 |
| $c_{4,7}$ | 0 | 0 |
| $c_{4,8}$ | 0 | 0 |
| $c_{4,9}$ | 0 | 0 |
| $c_{4,10}$ | 0 | 0 |
| $c_{6,0}$ | 0.00470142 | −0.01049631 |
| $c_{6,1}$ | 0.00667805 | −0.01978286 |
| $c_{6,2}$ | −0.03062507 | −0.01824176 |
| $c_{6,3}$ | −0.00213372 | 0.00212772 |
| $c_{6,4}$ | −0.00256455 | −0.00131309 |

TABLE 1-continued

| Parameter | Mirror-1 | Mirror-2 |
|---|---|---|
| $c_{6,5}$ | 0 | 0 |
| $c_{6,6}$ | 0 | 0 |
| $c_{6,7}$ | 0 | 0 |
| $c_{6,8}$ | 0 | 0 |
| $c_{6,9}$ | 0 | 0 |
| $c_{6,10}$ | 0 | 0 |
| $c_{8,0}$ | −0.00682394 | −0.0082152 |
| $c_{8,1}$ | 0.01123838 | −0.00529108 |
| $c_{8,2}$ | −0.00589758 | −0.01197266 |
| $c_{8,3}$ | 0 | 0 |
| $c_{8,4}$ | 0 | 0 |
| $c_{8,5}$ | 0 | 0 |
| $c_{8,6}$ | 0 | 0 |
| $c_{8,7}$ | 0 | 0 |
| $c_{8,8}$ | 0 | 0 |
| $c_{8,9}$ | 0 | 0 |
| $c_{8,10}$ | 0 | 0 |
| $c_{10,0}$ | −0.00240235 | 0.0005887 |
| $c_{10,1}$ | 0 | 0 |
| $c_{10,2}$ | 0 | 0 |
| $c_{10,3}$ | 0 | 0 |
| $c_{10,4}$ | 0 | 0 |
| $c_{10,5}$ | 0 | 0 |
| $c_{10,6}$ | 0 | 0 |
| $c_{10,7}$ | 0 | 0 |
| $c_{10,8}$ | 0 | 0 |
| $c_{10,9}$ | 0 | 0 |
| $c_{10,10}$ | 0 | 0 |

Reversed rays for different ipixels are traced from a notional eye pupil (displaced to the center 310 of the eye 314) towards the display 301, impinging on different opixels. This eye pupil allows us to simulate the performance of the ipixels when they are gazed while the eye is rotated, which are the ipixels whose performance should be the best. Raytrace simulation results indicate that the average rms spot diameter on the display 301 for the ipixels inside the gazed region of the virtual screen when they are gazed is about 70 microns. However, if the reversed rays from different ipixels are traced from the eye pupil at 310 when the eye is gazing frontwards, the image quality for these rays can be progressively relaxed when the peripheral angle increases, as permitted by the decreasing human eye resolution. As an example, the rms spot diameter of the reversed rays impinging on the display for an ipixel at a peripheral angle of 12° is about 160 microns, much higher than the value of the rms spot diameter for that ipixel when it is gazed, which is 56 microns. Since the focal length is about 52 mm, the forward ray-trace gives the result that the angular rms spot diameter of that ipixel seen through the pupil gazing frontwards is 10.3 arcmin. This is not perceived as blurred by the human eye, because it is smaller than 12 arcmin, which is what can be resolved by the human eye at 12 degrees peripheral angle (according to J. J. Kerr, "Visual resolution in the periphery", Perception & Psychophysics, Vol. 9 (3), 1971)

Figure 4:
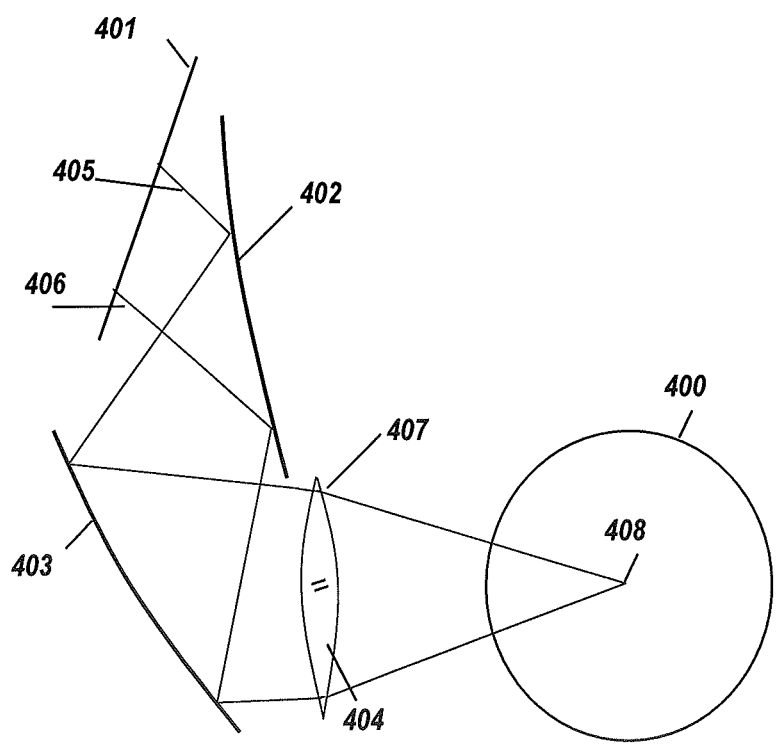
FIG. 4 shows a two-mirror free-form HMD with an additional lens providing a larger field of view.

The field of view of the design shown in FIG. 3 can be increased by putting a lens 404 between the second mirror 403 and the eye 400, as shown in FIG. 4. The rays 405, and 406, emitted by the display 401 undergo 2 reflections: first on freeform mirror surface 402 then on see-through freeform mirror 403. After the 2 reflections, these rays are refracted twice at the lens 404 being directed towards the eye center 408. The field of view is increased due to additional collimation at the lens 404, thus for the same distance between the mirror surfaces and the eye, a bigger angular spread of rays can be directed from the digital display to the eye. With this configuration, we have a monocular vertical and horizontal FoV of 70 degrees and 100 degrees, respectively, with a 16:9 display with a diagonal of 2.1", 55 mm. As an alternative embodiment, the lens 404 can be designed with low optical power (closer to a plano parallel plate) with the purpose of correcting non-chromatic aberrations.

Figure 5:
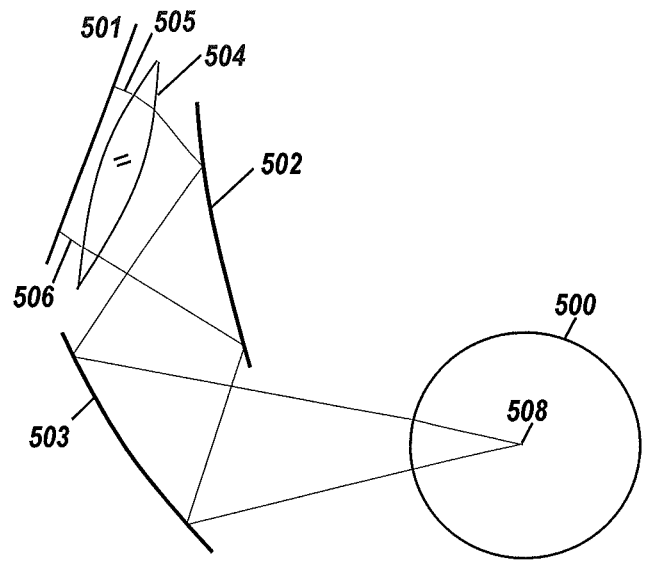
FIG. 5 shows a two-mirror free-form HMD with an additional lens between the display and the mirrors.

The position of the lens can be changed along the ray trajectory. FIG. 5 shows an embodiment with a lens 504 placed between a digital display 501 and first mirrored surface 502. Rays 505 and 506, emitted by the display 501, undergo two refractions at the lens 504, and then 2 reflections: a first reflection on the free-form mirror surface 502 and a second reflection on the see-through freeform mirror 503. After the 4 deflections, these rays are directed towards the eye center 508. In this case the field of view is not increased compared with the design presented in FIG. 3. However, since the lens provides more degrees of freedom in the optical design (compared to the design from FIG. 3), the geometrical aberrations can be reduced.

Figure 6:
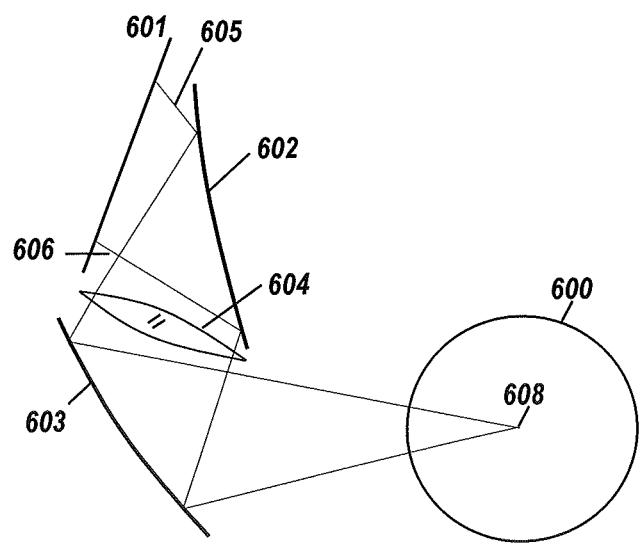
FIG. 6 shows a two-mirror free-form HMD with an additional lens between the mirrors.

Another embodiment is presented in FIG. 6. The lens 604 is placed between two mirrored surfaces 602 and 603. The rays 605 and 606 coming from digital display 601 first reflect on the mirrored surface 602, then refract twice at the lens 604, and finally reflect at the see-through freeform mirror 603. After the 4 deflections, these rays are directed towards the eye center 608. Here, as in FIG. 5, only the aberrations are reduced while the field of view is the same as in FIG. 3.

Figure 7:
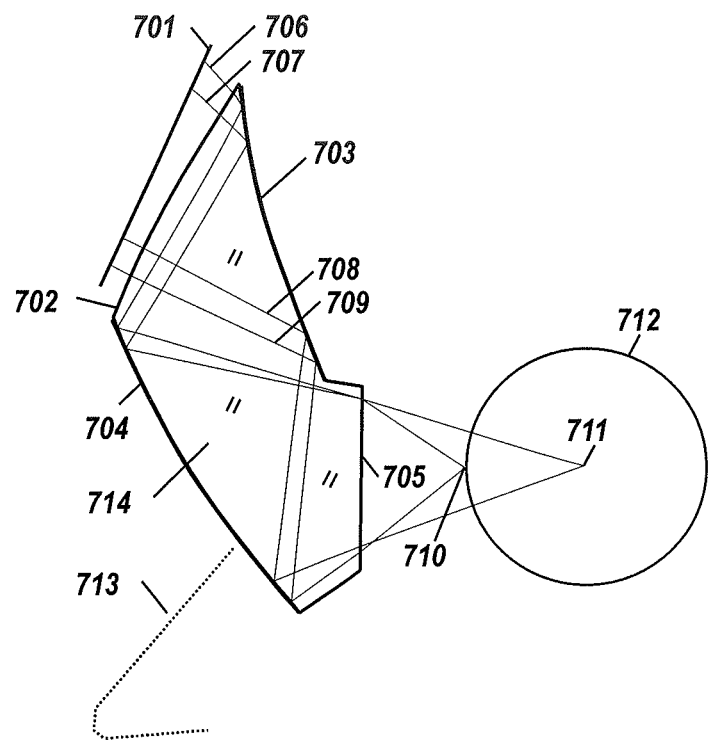
FIG. 7 shows a configuration for Virtual Reality (VR) applications with four free-form optical surfaces.

FIG. 7 shows a configuration consisting essentially of a tilted display 701 and a lens 714. All the optical surfaces are surfaces of the lens 714, as explained in more detail below. The user's nose 713 and eye 712 are shown for orientation. With this configuration, we have monocular vertical and horizontal fields of view of 70 degrees and 100 degrees, respectively, with a display diagonal of 2.1" (55 mm). This configuration contains 4 freeform optical surfaces, 2 refractive and 2 reflective. Rays 706, 707, 708 and 709 emitted by tilted display 701 suffer 4 deflections in total: first they refract on entrance surface 702, then reflect on surface 703, remaining inside lens 714, reflect on surface 704, remaining inside lens 714, refract on exit surface 705, and finally reach the eye 712. The rays 706 and 708 are directed towards the eye sphere center 711. The rays 706 and 709 define the vertical FoV of this mirror device as these are edge rays of the eye pupil center 710 when eye rests looking forward.

Figure 1:
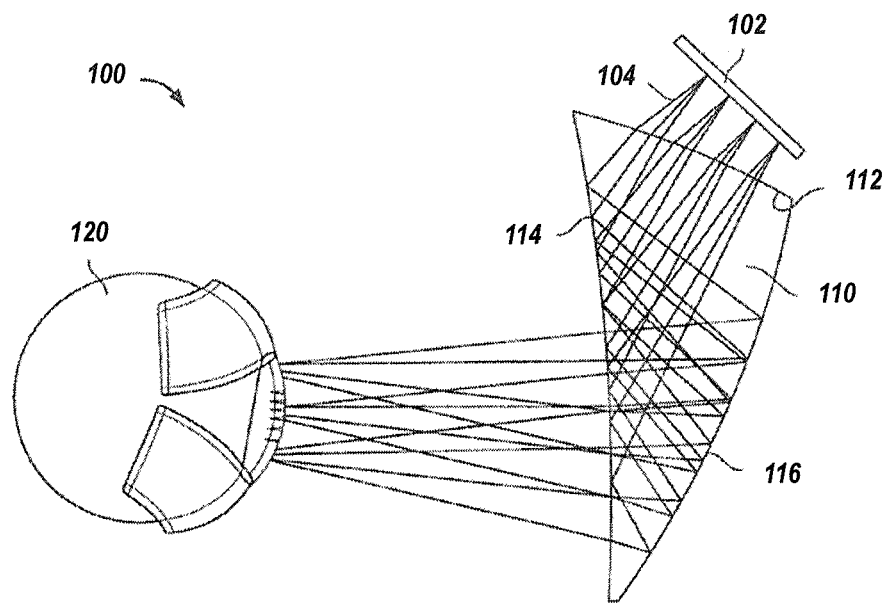
FIG. 1 shows a Head Mounted Display (HMD) with a free-form wedge-shaped prism designed by Morishima et al. in 1995 (prior art).
Figure 2:
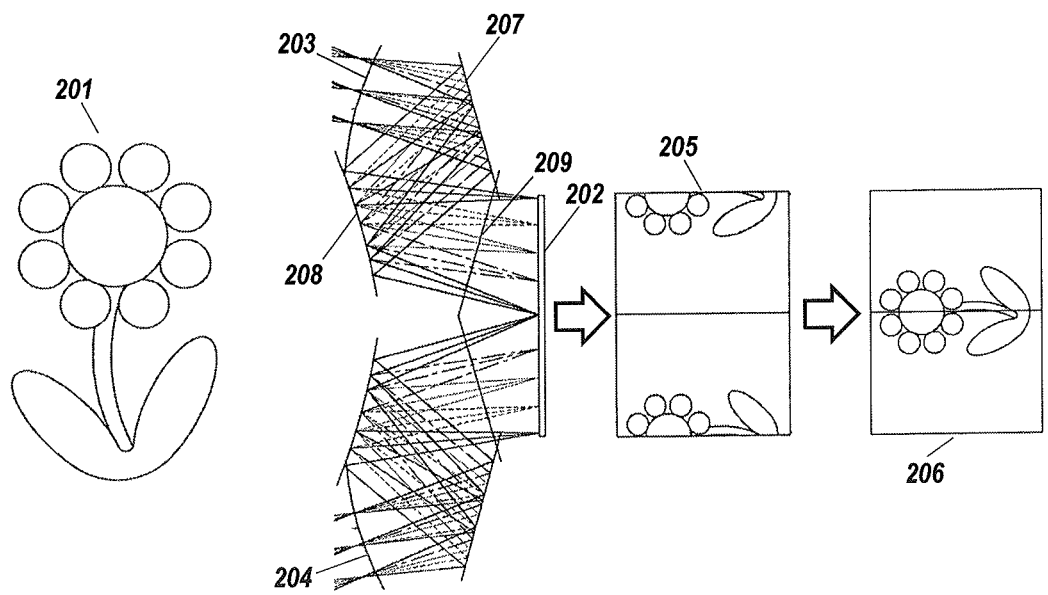
FIG. 2 shows a mobile camera optical lens system designed by Ho Sik You et al., in 2010 (prior art).
Figure 8:
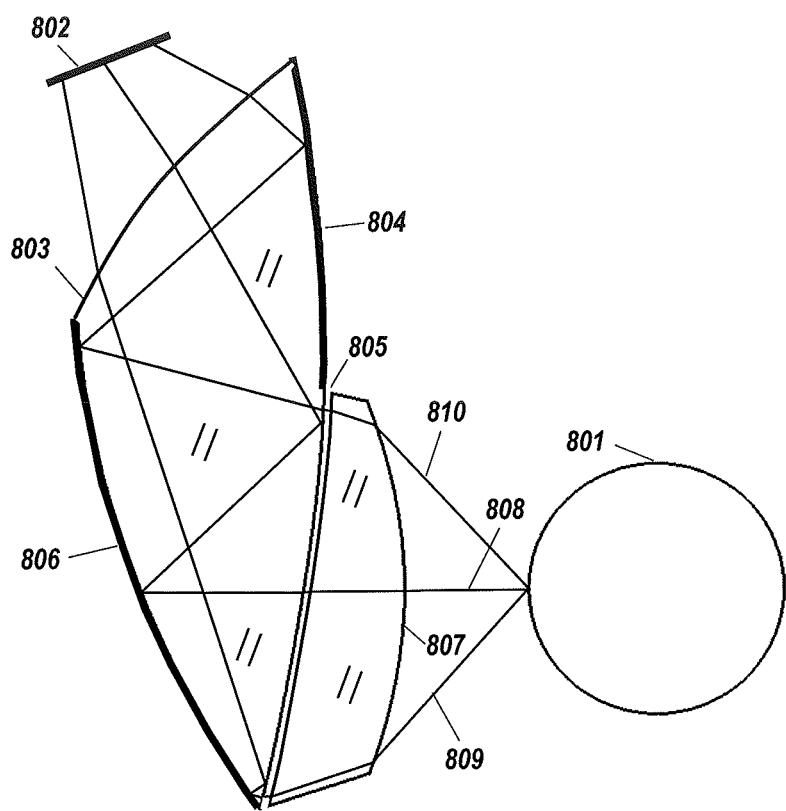
FIG. 8 shows an HMD with a free-form wedge-shaped prism lens with an additional free-form lens providing a larger field of view.

Another design is presented in FIG. 8. This design has two solid lenses separated by a narrow air-gap 805. The rays emitted by a digital display 802 are first refracted by entrance surface 803 of the first lens, then some rays are reflected by mirrored surface 804 and other rays are reflected by TIR thanks to the air-gap (or gap filled with low-refractive-index material such as fluoropolymer FEP) 805. All the rays are then reflected by mirrored surface 806. Afterwards, the rays go across the low-index-gap without experiencing major changes in their directions, and finally are refracted by exit surface 807 towards the eye 801. The ray 810 impinges on the mirrored part of surface 804, while the rays 808 and 809 are reflected by TIR by the air-gap 805. Compared to the prior art in FIG. 1, the field of view is increased due to additional collimation at surface 807, thus for the same distance between the optical system and the eye, a bigger angular spread (defined by the angle between rays 810 and 809) of rays can be directed from the digital display to the eye. Surface 804, which looks concave in FIG. 8, is convex at substantially all of its points in the direction perpendicular to the drawing.

Embodiments shown up to here are designed for virtual reality applications. From this point forward we show embodiments to be used for augmented reality (AR) applications allowing the user to see the surrounding reality through the optics.

Figure 9:
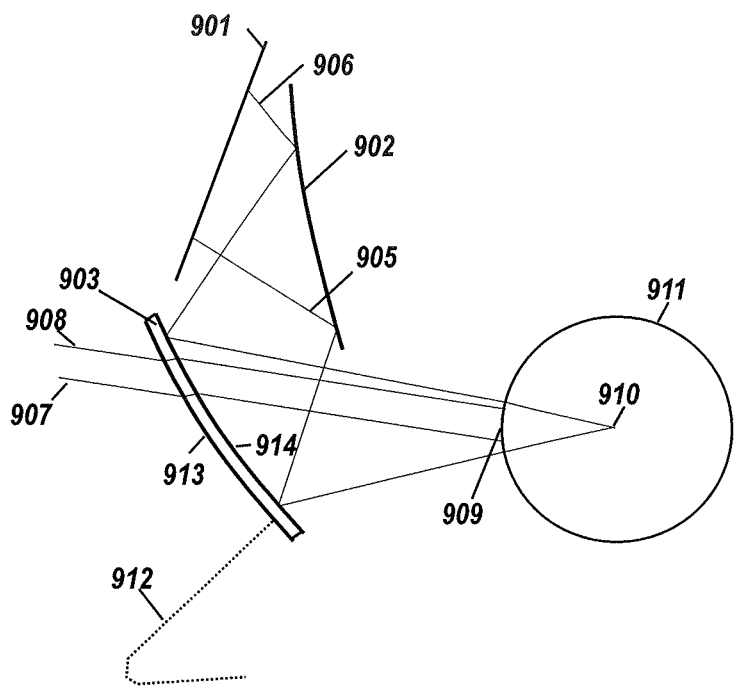
FIG. 9 shows a two-mirror free-form HMD for Augmented Reality (AR) applications.

The design shown in FIG. 3 can be easily adapted for AR application if mirror 303 is a "see-through" mirror, in which the substrate of mirror 303 is transparent and the reflective coating is partially transmissive. This is shown in FIG. 9, where the surface 914 of mirror 903 nearer to the eye 911 is preferably the one that is mirror coated. If the substrate is thin (<1 mm), then the distance between the surfaces 914 and 913 can just be a constant value, and any distortion of the see-through live view will be minimal. If a fine correction of the see-though quality is desired, particularly for thicker substrates, the frontward surface 913 can be designed with the condition that rays 907, 908 coming from the environment exit surface 914 in same direction they had before impinging on surface 913. The embodiments presented in FIG. 5 and FIG. 6 can be adapted for AR in the same way as shown in FIG. 9. Rays 905, 906, coming from display 901 via first mirror 902 behave in the same way as the corresponding rays in FIG. 3. The nose 912 is shown for orientation. 910 is the center of the eye 911, and 909 is the pupil range.

Figure 10:
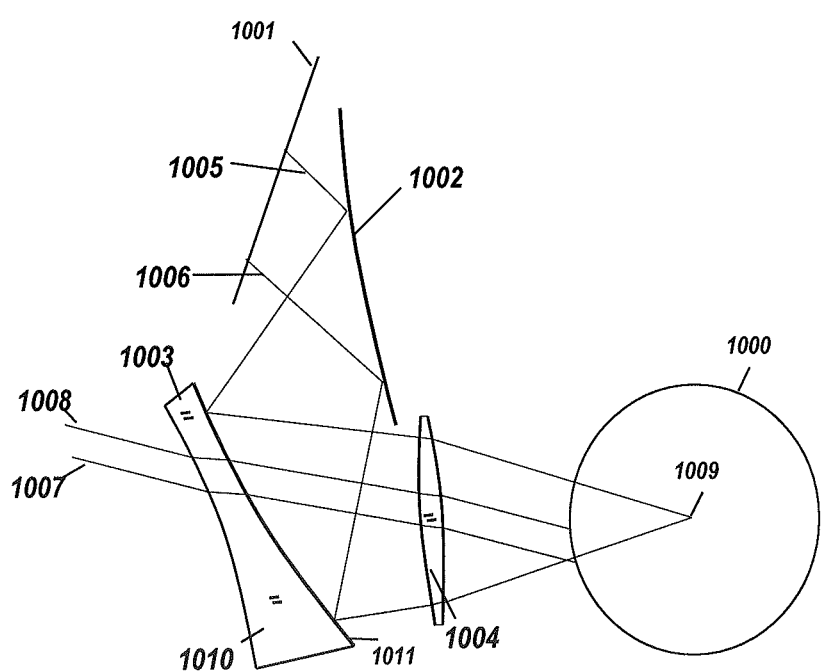
FIG. 10 shows a two-mirror free-form HMD for AR with an additional lens.

The design shown in FIG. 4 can be adapted for AR as shown in FIG. 10. The substrate of mirror 1003 is transparent and the reflective coating 1011, which is on the surface nearer to the eye 1000, is partially transmissive. The rays 1005 and 1006 coming from the display 1001 are reflected on mirror 1002 and reflective surface 1011, then refracted twice by lens 1004 being directed towards the eye center 1009. The substrate of mirror 1003 is a lens, and the frontward surface 1010 is designed with the condition that rays 1007, 1008 coming from the environment and refracted at surfaces 1010 and 1011 and also after two refractions at lens 1004 come to the eye in a direction parallel to the direction they have before impinging on 1010. In FIG. 10 the substrate of mirror 1003 is a biconcave lens, but that is not required in the general case.

Figure 11:
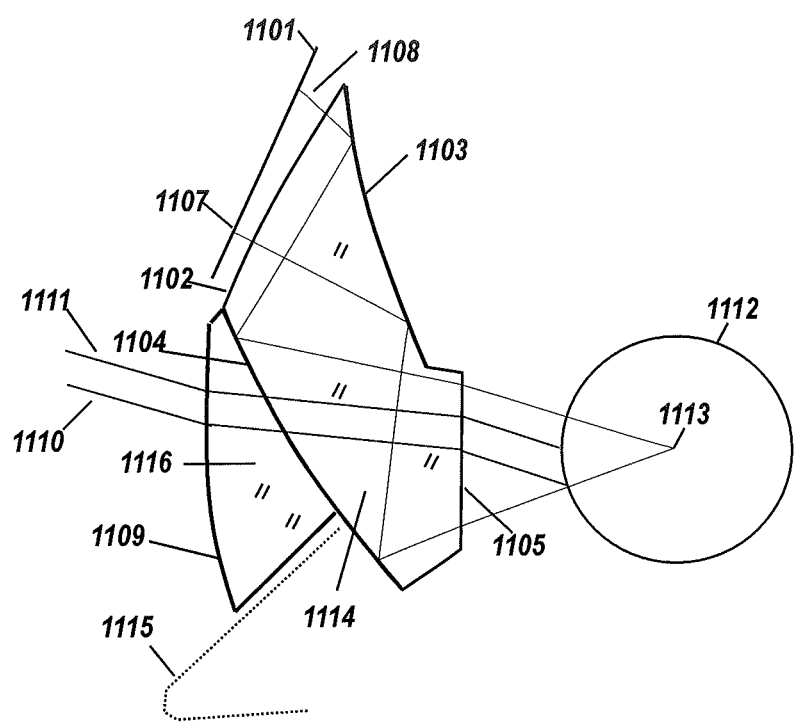
FIG. 11 shows an embodiment for AR with four free-form optical surfaces.

The embodiment shown in FIG. 11 is an adaptation of the embodiment in FIG. 7 to Augmented Reality applications. FIG. 11 shows a tilted display 1101, a lens 1114, and an additional piece of transparent material 1116. The user's nose 1115 and the eye 1112 are shown for orientation. The rays 1107 and 1108 emitted by the display 1101 suffer 4 deflections in total: first they refract at entrance surface 1102, then reflect on back surface 1103, reflect on semi-transparent surface 1104, which is at the boundary between the main lens 1114 and the additional piece 1116, refract at exit surface 1105, and finally reach the center 1113 of eye 1112. Thus a virtual image of a real image from the digital display 1101 is formed. On the other hand, rays 1110 and 1111 coming from the environment are first refracted at entrance surface 1109 of piece 1116, then refracted twice at the connection between piece 1116 and lens 1114. Since the two pieces of transparent material 1114, 1116 are very close to each other and the surfaces are parallel, this double refraction does not change the ray path considerably. The rays 1110, 1111 are then finally refracted at exit surface 1105, being redirected towards the eye. The entrance surface 1109 is designed so that after these refractions the rays 1110, 1111 preserve their directions, so the user is able to see through the optical system. As the result the user perceives both a virtual image of the digital display 1101 and the environment that surrounds the user.

Figure 12:
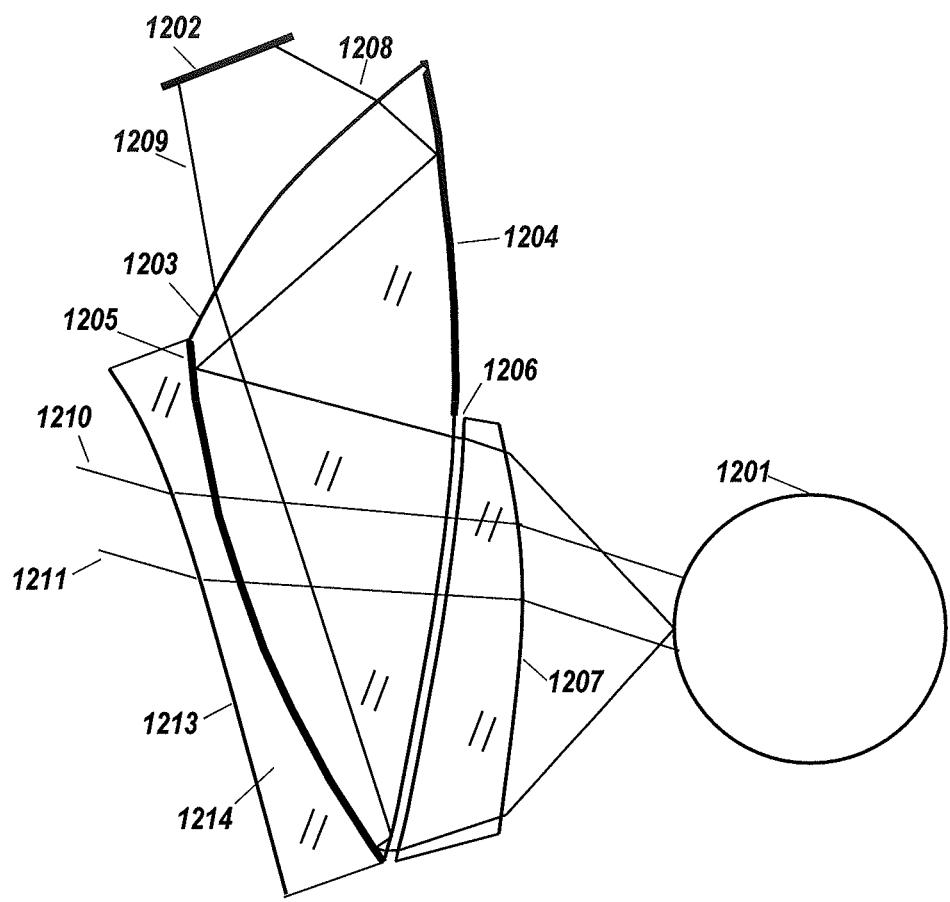
FIG. 12 shows an HMD for AR with a free-form wedge-shaped prism and with an additional free-form lens.

The embodiment shown in FIG. 12 is the adaptation of the embodiment in FIG. 8 to AR. Rays 1208 and 1209 coming from a tilted display 1202 have the same trajectories as in FIG. 8. The rays 1208, 1209 are refracted at entrance surface 1203, reflected on back surface 1204 (partly at a metallic reflector and partly by TIR at low-index gap 1206), reflected on semitransparent surface 1205, pass across low-index gap 1206, are then refracted at exit surface 1207, and finally reach the eye 1201. An additional piece 1214 of transparent material (lens) is placed with its eyeward surface on the back of semitransparent mirror 1205. The frontward entrance surface of additional piece 1214 is designed with the condition that rays 1210, 1211 coming from the environment reach the eye in direction parallel to the one they have before impinging on 1213. These rays are refracted at entrance surface 1213, pass through semitransparent mirror 1205, pass across thin air gap 1206, and are finally refracted at exit surface 1207.

Although specific embodiments have been described, the preceding description of presently contemplated modes of practicing the invention is not to be taken in a limiting sense, but is made merely for the purpose of describing certain general principles of the invention. Variations are possible from the specific embodiments described. For example, the patents and applications cross-referenced above describe systems and methods that may advantageously be combined with the teachings of the present application. Although specific embodiments have been described, the skilled person will understand how features of different embodiments may be combined.

The full scope of the invention should be determined with reference to the claims, and features of any two or more of the claims may be combined.

The invention claimed is:

1. A display device comprising:
a single display, operable to generate a real image; and
an imaging optical system, comprising at least first and second free-form reflective surfaces, such that at least one of the first and second reflective surfaces is convex in at least one direction at substantially all points;
wherein the first and second reflective surfaces are arranged to generate a virtual image from the real image on the single display, by projecting light from the single display to a position of a single eye;
wherein the first and second reflective surfaces are configured to provide only one reflection each;
wherein the field of view occupied by the virtual image as seen from the eye position is greater than 50 degrees in at least one direction;
wherein the imaging optical system is arranged to produce the virtual image that when projected by a normal human eye onto the retina of said eye when said eye is at a position of an imaginary sphere, the resolution of the part of said virtual image to be projected onto a 1.5 mm fovea when the pupil of the eye is within a pupil range has a higher resolution than the resolution of the same part of said virtual image when said pupil is at a different position within the pupil range such that said part of said virtual image is to be projected outside the fovea, said resolution difference being adapted to the visual resolution curve in the periphery of a normal human eye.

2. The display device of claim 1, wherein the at least one of the first and second reflective surfaces that is convex in at least one direction at substantially all optically active points is the first reflective surface, wherein the second reflective surface is concave at substantially all optically active points, and wherein the light rays from the display are reflected on the first reflective surface before they are reflected on the second reflective surface.

3. The display device of claim 2, wherein the first and second reflective surfaces are arranged to generate a virtual image from the real image on the display, by projecting light without further reflections from the single display to an eye position.

4. The display device of claim 1, further comprising a lens in the optical path between the single display and the eye position, and wherein the field of view in the at least one direction is more than 80 degrees.

5. The display device of claim 4, wherein the lens is between the single display and the first reflective surface.

6. The display device of claim 4, wherein the lens is between the first reflective surface and the second reflective surface.

7. The display device of claim 1, wherein the second reflective surface is semitransparent and is on a transparent substrate, permitting a direct view of an external environment from the eye position.

8. The display device of claim 7, wherein the second reflective surface is on a surface of the transparent substrate nearer to the eye position or is adjacent to an additional transparent substrate further from the eye than the second reflective surface, and wherein a frontward entrance surface of said transparent substrate or said additional transparent substrate, through which light from the external environment enters the optical system, is so formed that light rays from the external environment exiting the optical system to the eye position exits the optical system substantially parallel to directions in which the respective rays entered the optical system.

9. The display device of claim 7, wherein the single display is offset laterally from a direct line of view of the eye.

10. The display device of claim 1, wherein the optical system is configured such that when placed at a distance between 5 and 40 mm from an anticipated forward periphery of an eye position defined by an imaginary 13 mm radius sphere, the optical system subtending a solid angle from a closest point horizontally on the imaginary sphere comprising a cone with 40 degrees whole angle, wherein the single display is on a side of the optical system remote from the imaginary sphere, at a distance from the optical system of no more than 40 mm.

11. A headgear comprising the display device of claim 1, with a mount for positioning the display device on a human head with the eye position of the display device coinciding with an eye of the human.

12. The headgear of claim 11, wherein said at least one direction in which the field of view occupied by the virtual image as seen from the eye position is greater than 50 degrees is parallel to a direction joining the eyes of a person wearing the headgear.

13. The headgear of claim 11, further comprising a second display device, mounted with an eye position of the second display device coinciding with a second eye of the human.

14. The display device of claim 1, wherein the reflective surfaces are mirrored.

* * * * *